United States Patent Office 3,291,907
Patented Dec. 13, 1966

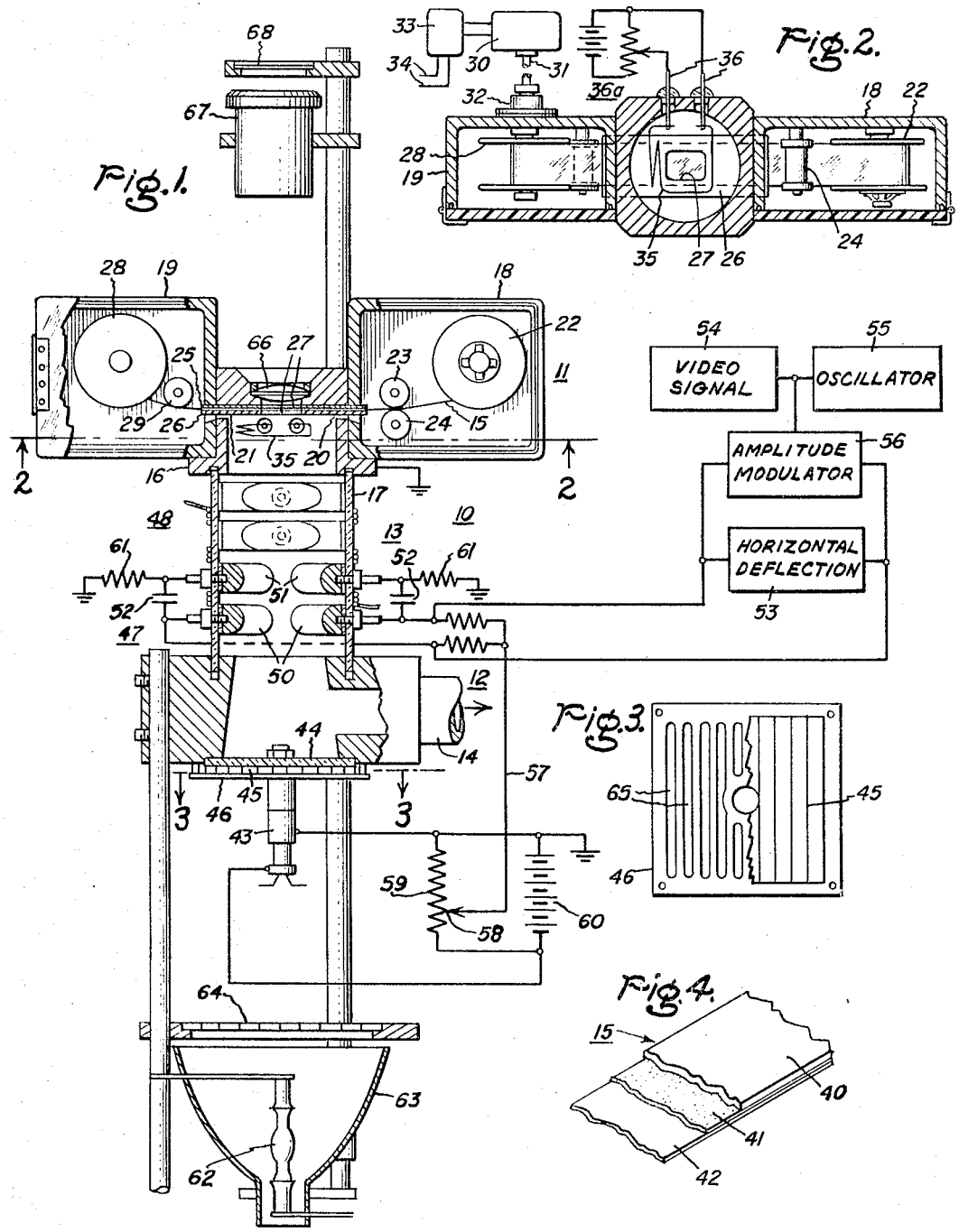

3,291,907
LIGHT VALVE PROJECTOR WITH LIGHT MODULATING MEDIUM HEATING MEANS
William E. Glenn, Jr., Scotia, N.Y., assignor to General Electric Company, a corporation of New York
Filed Oct. 18, 1963, Ser. No. 317,269
5 Claims. (Cl. 178—7.87)

The present invention relates to a light valve projection system of the type in which a liquid light valve medium is deformed with light controlling deformations corresponding to the light to be projected and particularly to improvements in the means for providing and renewing the thin, viscous liquid layer which provides the deformable light valve medium.

Light valve projection systems in which a light modulating medium is subjected to an electron beam modulated in accordance with the information to be projected have been provided in which a thin layer of liquid is provided on a suitable carrier such as a mirror or transparent plate and various mechanical means have been provided for producing the required thin layer of the medium. One system of this type is shown in Patent 2,391,451—Fischer granted December 25, 1945, in which the electron beam is controlled in accordance with black and white television signals to produce a pattern of deformations corresponding to the intensity of the light point-by-point over a raster area and the picture is projected by an optical system of the type usually designated a Schlieren optical system in which light masking means blocks the light emanating from the light valve medium where it is undeformed and passes light in accordance with the amplitude of the deformations. Improvements in this type of system have been made in accordance with which color television pictures are projected from superimposed deformations providing diffraction gratings of different spacings and the projection system is capable of cooperating with the deformations to select the color in accordance with the different wavelengths of the gratings and to pass light of an intensity determined by the amplitude of the gratings. Such a system is described and claimed in my Reissue Patent No. 25,169, granted May 15, 1962.

A number of problems are involved in maintaining a thin layer of the liquid light modulating medium which is smooth and of uniform and proper viscosity to produce the light controlling deformations in response to the forces exerted by the electric charge pattern. Also the presence of liquid within the evacuated envelope within which it is preferably housed along with the beam generating and control apparatus, poses a problem with respect to the vapor pressure of the constituents at the temperature at which the liquid has the desired viscosity. A quantity of liquid within the envelope is a disadvantage during shipment or other moving of the equipment. Also the mediums used tend to be subject to radiation damage and tend to become more viscous at a given temperature as use continues. It is accordingly an object of the present invention to provide improved apparatus for maintaining in the writing and projection area a thin layer of the modulating medium having the desired characteristics and which is limited in extent to limit the vapor pressure of the constituents that may be given off within the vacuum chamber.

In accordance with a preferred embodiment of the invention, the liquid modulating medium is provided by a thin layer of transparent material, preferably a thermoplastic, applied to a tape carrier and which has form stability at room temperature but which is heated in the immediate area of the writing and light projection path within the envelope to provide the desired area of thin, deformable liquid of desired viscosity. It has been found that the viscosity at a given temperature tends to increase upon continued exposure to an electron beam and I have further found that an increase in temperature will compensate for this increase in viscosity that tends to result from electron bombardment and accordingly I provide means for heating the thin liquid layer which has a greater heat input adjacent the area which has been subjected to the beam for a longer period of time so that the viscosity over the raster area is substantially uniform. This feature is particularly important when the liquid area is not circulated but is moved very slowly out of the raster area at a rate determined primarily by the useful life of the medium as a light valve liquid.

The present invention provides a layer of the required thickness and smoothness which has the desired and a uniform viscosity over the raster area and results in a minimum of vapor within the electric discharge device. Further objects and advantages of the invention will become apparent as the following description proceeds, reference being had to the drawing in which:

FIG. 1 is an elevational view in section of an electron beam writing and light valve projection apparatus embodying my invention;

FIG. 2 is a sectional view taken along the line 2—2 of FIG. 1;

FIG. 3 is a plan view, partially broken away, of a mask and lens assembly used in the projector of FIG. 1; and FIG. 4 is an enlarged view showing the construction of the tape construction used in the device of FIG. 1.

In my copending application Serial No. 119,712, filed June 26, 1961, I have described and claimed an electron beam writing and light valve projection apparatus suitable for projecting color television pictures and which utiilzes orthogonally arranged diffraction gratings. The electron beam writing and projection apparatus illustrated in the present application, apart from the improved light valve medium providing and renewing means, is similar to that described in the aforementioned application, but it has been simplified for purposes of illustration of this application in that, in the form illustrated, it is particularly suited to the writing and projection of black and white color television pictures. It will be understood, however, that the present invention is not limited to any particular type of picture information.

As illustrated in FIG. 1 of the drawing, I have shown my invention embodied in apparatus for providing and renewing the light modulating medium in an electron beam writing and light valve projection apparatus including an evacuable envelope 10, including a tape section 11, an electron beam generating section 12, and an intermediate beam deflection and control section 13. The sections 11, 12 and 13 together form the evacuable envelope which may be connected through conduit 14 to suitable evacuating apparatus or if desired the interior of the envelope may be sealed off and the interior of the envelope provided with suitable gettering material (not shown) to assist in maintaining the vacuum. In accordance with the preferred embodiment illustrated, the medium which is to be deformed by the electron beam and through which the light to be projected passes is provided by a tape 15. The tape unit 11, as clearly illustrated in FIGS. 1 and 2, includes a hollow body portion 16 which rests upon and closes the upper end of a glass cylinder 17 which provides the enclosure of the focusing and deflection section 13. The tape unit 11 includes in addition similar supply and takeup housings 18 and 19 hermetically sealed to opposite sides of the central body portion 16 and each communicating with the interior of the body portion through registering slots 20 and 21 in the body portion and the supply and takeup housing, respectively. As illustrated, these slots are enlarged near the center portions thereof to provide for the free communication of gas between the housings and the body portion of the tape unit 11. A supply reel 22 in housing 18 provides a supply of tape which passes between guide rollers 23 and 24 which are relieved at the central portions thereof so as to engage only the edges of the tape. Received within the slots 20 and 21 are mating tape guiding members 25 and 26 which are provided with registering openings at the central portion thereof to provide a centrally located raster area 27. The members 25 and 26 engage one another only at the edges to provide a guide slot through the central portions thereof through which the tape is moved. Housing 19 houses a takeup reel 28 and is provided with a suitable guide roller 29.

As illustrated particularly in FIG. 2, the takeup reel 28 is a driven reel and is driven by an electric motor 30 exterior of the takeup reel housing 19 and having the shaft 31 thereof connected with the reel driving shaft through a bearing and seal assembly 32. The motor 30 may be a clock motor, for example, which will move the tape at a slow rate of speed related to the useful life of the light modulating medium. If the hub of the takeup roller 28 is made large, the change in linear speed of the tape as the amount of tape on the reel changes is small. As an alternative, the motor 30 may be an adjustable speed motor energized through a speed control device illustrated schematically at 33 and energized from suitable electric supply lines 34 so that the speed may be adjusted as the takeup reel fills with tape so as to maintain the tape speed substantially constant. As another alternative, the torque speed characteristic may be such as to maintain a constant tape speed.

Means for heating the tape on the side thereof facing the electron beam is provided by a resistance type heater element 35 which surrounds the raster area as best shown in FIG. 2 and is supported by rigid lead-in conductors 36 which are hermetically sealed through the central portion 16 of the tape unit 11. As illustrated, the resistance heating unit has additional turns at the exit end of the raster area 27 and this tends to supply a greater heat input at the exit end of the raster area to maintain the liquid medium such as the melted thermoplastic in that region at a higher temperature or in other words to provide a temperature gradient across the raster area of the medium which is sufficient to compensate for the effect on viscosity of the irradiation of the material. Thus, the high temperature end of the material is that material which has been longest subjected to the electron beam. The level of heat input may be controlled by an adjustable direct current voltage supply 36a connected to lead-in conductor 36. Since the tape is heated by infrared radiation, the amount of heat supplied at any given location may be adjusted by bending the heater element to vary the distance between the element and the tape surface.

As best shown in the enlarged FIG. 4, the tape includes in a preferred form, a relatively thick transparent supporting or base layer 40, an intermediate transparent conducting layer 41, and a thin layer of a deformable medium 42. The thickness of the base layer is not critical and excellent results have been obtained with a base strip of 4 mils thickness. One suitable material for the base is an optical grade of polyethylene terephthalate, sold under the name of Cronar. Mylar is also suitable. The thin transparent conducting layer 41 may be formed of a number of materials in accordance with known processes. A copper iodide film may be formed by evaporating copper onto the base and passing the coated base through a solution of iodine and alcohol. The conducting coating is controlled in thickness so that it exhibits a resistance in the order of 1000 ohms per square. In the case of the copper iodide coating just described, a coating of 150–300 angstroms thick is suitable. An evaporated chromium layer is also suitable and a conducting film thickness of approximately 35 angstroms is suitable for this type of coating. The layer 42 which is a solid in the sense of having reasonable form stability at room temperature is in a technical sense a very viscous liquid at room temperature. It is melted, that it is heated in the raster area to reduce the viscosity to something in the order of 1000 centistokes. The material may to advantage be a thermoplastic exhibiting good resistance to radiation and having a relatively low vapor pressure at a temperature at which it has the desired viscosity for giving the desired mechanical deformation in response to the electric charge pattern established by an electron beam. The following are examples of suitable materials for the layer 42. One suitable material for layer 42 is a highly aromatic silicone having a viscosity of several thousand centistokes at room temperature such as biphenylyl methylphenylsilyl chain-stopped diphenyl polysiloxane having an average of about two diphenyl siloxanes per molecule. Such a material exhibits a viscosity of about 1000 centistokes at 90° C. After an exposure to an electron beam of about 2 microamps at 8 kilovolts and scanned over a 1 square inch raster for a period of 90 minutes, the viscosity increases to the point where a temperature of 130° C. is necessary to maintain the viscosity at 1000 centistokes. With such a material and with a base which withstands 130° C., it will be necessary to draw the tape through the raster area at a rate whish would at least remove it from the raster area after an exposure of 90 minutes. For an inch and a half raster, for example, this would require a linear movement of the tape of 1 inch per hour. This material has very good form stability at room temperature.

Another material suitable for the light modulating medium which is not as form stable at room temperature but has a longer useful life, is a mixture of ortho- and para-biphenyl silicates of the formulas

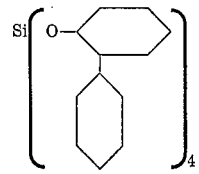

and

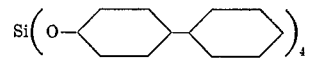

Such a mixture was prepared by heating a mixture of 0.2 mol o-phenylphenol, 0.2 mol p-phenylphenol, and 0.1 mol ethyl silicate for 80 minutes at temperatures below 235° C. until 6.2 ml. ethanol had distilled off, indicating that the ethyl silicate had undergone reaction, i.e., a biphenyl group had replaced an ethyl group. The mixture was then heated to 360° C. for 195 minutes to give an additional 18.4 ml. of ethanol. The product was distilled and a cut boiling at 310° C. at 7 microns was removed and used as the material for the light modulating medium. This medium exhibited a viscosity of 1000 centistokes at about 65° C. and after being subjected to an electron beam as described in the preceding example for a period of 3½ hours, exhibited the same viscosity at 130° C. Thus, this material could be moved through the raster area at a rate as slow as 1 inch per 3½ hours provided the temperature of the medium at the exit end of the raster is maintained at 130° C.

The electron writing beam for depositing a charge pattern over the raster area corresponding to the desired pattern of deformations of the layer 42 and to the light image to be projected is produced by an electron gun assembly shown in outline at 43. The gun is secured centrally of the end of the beam generation portion 12 of the envelope by means of an assembly including a transparent end wall 44 provided by a glass disk an array of cylindrical lenticular lens elements 45 and a bar and slot light mask 46. As shown, the assembly is held against the end of the housing 12 by means of a plurality of screws extending through the openings in the light mask 46. Electrons are accelerated and emanate from the electron gun as a beam directed toward the raster area of the tape unit 11. The beam passes between two sets of crossed cylindrical lenses 47 and 48 which are energized by suitable horizontal and vertical scanning voltages, respectively, and are maintained at appropriate direct current potentials to focus the beam in two directions parallel to adjacent edges of the raster area. Also, the information to be impressed on the medium in the form of light controlling deformations is produced by an electron charge pattern which varies over the raster area in accordance with the information. The charge pattern is produced by velocity modulating the horizontal deflection in accordance with the video information. While it is believed that the energization of the electrodes for deflecting and modulating the electron beam in accordance with black and white television information, for example, will be readily apparent to those skilled in the art and follows in a straightforward manner from the disclosure of the aforementioned copending application Serial No. 119,712, filed April 26, 1961, it will be briefly described. The two sets of opposed electrodes 50 and 51 making up the horizontal set 47 are connected together with respect to alternating voltages by capacitors 52 but are insulated with respect to direct current voltages to permit the operation thereof at different direct current voltages for focusing purposes. The electrodes are energized by a horizontal deflection voltage supplied by source 53 and a superimposed amplitude modulated voltage having an amplitude which varies in accordance with the intensity of the video signal voltage provided by source 54. The output of the video signal amplitude modulates the output of an oscillator 55 in amplitude modulator 56 which has the output thereof connected to the opposing horizontal deflection electrodes. The frequency of the oscillator determines the grating spacing of the deformations formed on the modulating medium and may be 5 to 10 megacycles, for example. As illustrated the electrodes 50 are connected to a suitable direct current voltage near cathode voltage by conductor 57 which is connected to point 58 on the voltage dividing resistor 59 connected across the direct current supply 60. The electrodes 51 are maintained at a voltage somewhat below the anode voltage by resistors 61 which are connected between the electrodes 51 and ground.

The light system for projecting a picture in accordance with the information on the modulating medium includes in addition to the lenses 45 and mask 46 an intense light source such as a projection lamp 62 mounted within an ellipsoidal mirror 63. The open end of the mirror is directed toward the light modulating medium and near the open end thereof is mounted a lenticular lens assembly including a plurality of cylindrical lenticular lenses 64 positioned in side by side relation. These lenses correspond in number to the slots 65 in the input light mask 46 and image the light source in these slots. The cylindrical lenticular lenses 45 mounted adjacent mask 46 image the source lenses 64 on the raster area of the modulating medium with each image occupying the full raster area. The output optics include a Schlieren lens 66 and a projection lens 67 which may be the projection lens of a slide projector. The projection path also includes an output light mask 68 similar to the mask 46 but optically displaced so that in the absence of deformations of the modulating medium, light passing the input slots 65 of mask 46 are imaged on the base of the output mask 68.

The operation of the illustrated embodiment of my invention will now be briefly described. Assuming that the evacuable envelope has been fully evacuated through the port 14, the heater element 36 is energized to melt the layer 42 in the raster area 27. The electron beam provided by the electron gun assembly impinges on the medium 42 in the raster area and is scanned over the raster area by the horizontal deflecting electrodes 47 and the vertical deflection electrodes 48. The electron beam is also focused into a spot by the direct current potentials of these electrode sets. When no light is to be transmitted to the screen (not shown) there is no modulation of the horizontal sweep. The undeformed medium does not deviate the light and the light from the source 62 is focused by the individual source lenticular lenses 64 to fall in the slots 65 in the input mask 46 and this light is imaged on the raster area by the lenticular lenses 45. No light is projected on the screen, however, since with the medium undeformed, the slots of the input mask are imaged on the bars of the output mask 68 by the Schlieren lens 66. When there is a video signal, the horizontal sweep is velocity modulated at a frequency determined by the oscillator 55 and with an amplitude dependent upon the amplitude of the video signal. This velocity modulation of the sweep results in increases and decreases in the electron charge density along the raster line and results in a diffraction grating which deviates the light so that it passes through the slots of the output mask with an intensity dependent upon the amplitude of the deformations of the medium. Since the medium is imaged on the screen (not shown) the light on the screen corresponds point-by-point with the deformations of the medium and the light is therefore controlled point-by-point in accordance with the video signal to reproduce the television picture. The medium is moved through the raster area at a rate dependent upon the useful life of the medium, i.e., the length of time that the medium may be subjected to the electron beam without a substantial increase in viscosity taking into account the elevated temperature of the exit end of the medium. The energization of the heater 25 is adjusted so that the temperature reached by the medium at the entrance into the raster area is about that at which the viscosity of the medium is 1000 centistokes and the heater is designed so that the temperature at the exit end is approximately 130° C., this being a practical upper limit for the tape base commonly employed. The rate of movement of the tape through the raster area is then determined by the length of time required for the viscosity of the liquid to increase with electron bombardment so that the temperature rise is just sufficient to maintain the 1000 centistoke viscosity at the exit.

It will be apparent that the present invention provides an improved means for maintaining in the raster area of an electron beam writing and light projection apparatus a thin layer of liquid light modulating medium of a desired viscosity and one in which the viscosity is substantially uniform throughout the raster area. The invention also provides for a renewal of the medium at substantially the rate determined by the useful life of the material by slowly moving the tape carrier through the raster area.

While I have shown and described a preferred embodiment of my invention, it will be apparent to those skilled in the art that many changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. A light valve projector comprising an evacuable envelope having a transparent wall portion, means within said envelope providing a light modulating medium extending across a projection light path including said transparent wall portion, said means including a tape having a thermoplastic surface, means for heating said thermoplastic surface over an area in the light path through said transparent wall portion to a temperature which renders it a viscous liquid which is readily deformed by the forces of an electric charge, means providing an electron beam within said envelope and impinging it on said medium, means for deflecting and intelligence modulating said beam to establish an electric charge pattern over said area corresponding to intelligence to be projected to correspondingly deform said medium and means for moving said tape transversely with respect to said projection light path at a rate which is slow compared to the rate at which the beam is deflected over said area and which removes said thermoplastic from said area as it becomes damaged by the impingement thereon of said electron beam, said light path including a light source and Schlieren optics cooperating with the deformations of said medium to project light corresponding to the intelligence impressed on said medium by said modulated beam.

2. A light valve projector comprising an evacuable envelope having a transparent wall portion, means within said envelope providing a light modulating medium extending across a projection light path including said transparent wall portion, said means including a transparent support having a thermoplastic surface exhibiting form stability at room temperature, means for heating said thermoplastic surface over an area in the light path through said transparent wall portion to a temperature which renders it a viscous liquid which is readily deformed by the forces of an electric charge, means providing an electron beam within said envelope and means for controlling and deflecting said beam over said medium to establish an electric charge pattern thereon corresponding to intelligence to be projected to correspondingly deform said medium, means for moving said support transversely with respect to said projection light path at a rate which is slow compared to the rate at which the beam is deflected over said area and which removes said thermoplastic from said area independently of the rate of scanning thereof, said light path including a light source and light masking means cooperating with the deformations of said medium to selectively project light corresponding to the intelligence impressed on said medium by said electron beam.

3. A light valve projector comprising an evacuable envelope having a transparent wall portion, means within said envelope providing a light modulating medium extending across a projection light path including said transparent wall portion, said means including a tape having a thin transparent layer which exhibits form stability at room temperature, means for heating said layer over an area in the light path through said transparent wall portion to a temperature which renders it a viscous liquid which is readily deformed by the forces of an electron charge, means providing an electron beam within said envelope and means for controlling and deflecting the electron beam over said layer to establish a charge pattern over said area corresponding to intelligence to be projected to produce a corresponding pattern of light controlling deformations on said layer, means for moving said tape transversely with respect to said projection light path at a rate which is slow compared to the rate at which the beam is deflected over said area and which removes said tape from said area as said layer becomes damaged by the impingement thereon of the electron beam, said light path including a light source and light masking means cooperating with the deformations of said layer to project light corresponding to the intelligence impressed on said layer by the electron beam.

4. A light valve projector comprising an evacuable envelope having a transparent wall portion, means within said envelope providing a light modulating medium extending across a projection light path including said transparent wall portion, said means including a support having a thin transparent surface layer which exhibits form stability at room temperature, means for heating said layer over an area in the light path through said transparent wall portion to a temperature which renders it a viscous liquid which is readily deformed by the forces of an electric charge, means providing an electron beam within said envelope and means for controlling and deflecting said beam to establish an electric charge pattern over said area corresponding to intelligence to be projected to produce a corresponding pattern of light controlling deformations on said layer, means for moving said support transversely with respect to said projection light path, said light path including a light source and light masking means cooperating with the deformations of said medium to project light corresponding to the intelligence impressed on said layer by the electron beam, said means for heating providing an increasing heat input to said layer in the direction of movement of said support so that the portion of said area which has been longer subjected to the electron beam is operated at a higher temperature thereby to compensate for the increase in viscosity at a given temperature resulting from the exposure of said layer to the electron beam.

5. In combination, an evacuable envelope, means providing an electron beam within said envelope, means within said envelope providing a light modulating medium including a tape extending transversely with respect to the path of the electron beam and having a thin transparent thermoplastic surface layer, means for heating said transparent surface layer over an area thereof to a temperature which renders it a viscous liquid which is readily deformed by the forces of an electric charge, means for controlling and deflecting the electron beam to establish an electric charge pattern over said area corresponding to intelligence to be impressed on said layer to produce a corresponding pattern of light controlling deformations thereon, and means for moving said tape transversely with respect to the electron beam, said means for heating providing an increasing heat input to said layer in the direction of movement so that the portion of said area which has been longer subjected to the electron beam is operated at a higher temperature thereby to compensate for the increase in viscosity at a given temperature resulting from the exposure of said layer to the electron beam.

References Cited by the Examiner

UNITED STATES PATENTS

| | | | |
|---|---|---|---|
| 2,391,451 | 12/1945 | Fischer | 178—7.5 |
| 3,118,969 | 1/1964 | Glenn | 178—6.6 |
| 3,120,991 | 2/1964 | Newberry | 178—6.6 |

DAVID G. REDINBAUGH, *Primary Examiner.*

I. McHUGH, R. L. RICHARDSON, *Assistant Examiners.*